Dec. 19, 1922.    1,439,469.
C. H. HAPGOOD.
TESTING MACHINE FOR PISTON RINGS AND THE LIKE.
FILED FEB. 1, 1918.
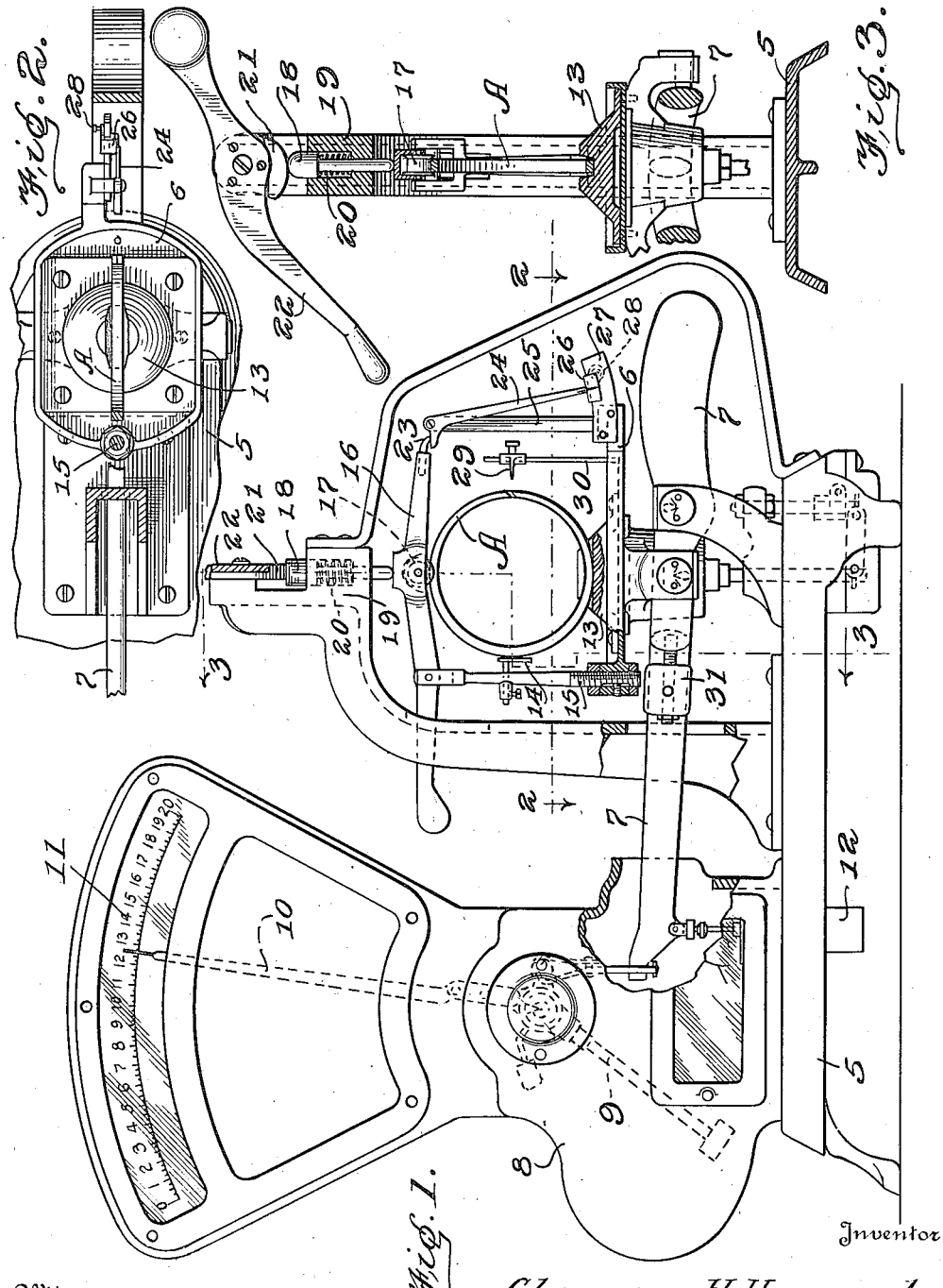
Inventor
Clarence H. Hapgood
By George R. Frye
Attorney
Witnesses
V. V. Lybrand Patented Dec. 19, 1922.                                                1,439,469

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF OHIO.

TESTING MACHINE FOR PISTON RINGS AND THE LIKE.

Application filed February 1, 1918. Serial No. 214,823.

*To all whom it may concern:*

Be it known that I, CLARENCE H. HAPGOOD, a citizen of the United States, residing at Toledo, in the county of Lucas and State of Ohio, have invented certain new and useful Improvements in Testing Machines for Piston Rings and the like, as set forth in the annexed specification.

This invention relates to testing machines for piston rings and the like, and more particularly discloses a device for conveniently and accurately determining the expansive force of split rings, etc., such as are commonly used for piston rings, when such rings are maintained at a predetermined diameter.

In the cylinders of motors for aeroplanes, automobiles, etc. it is vital that all the piston rings used in the same cylinder have the same expansive force, and it is the aim and desire of the best motor builders to have all the rings used in any motor of the same expansive force. To enable this is the primary object of my invention.

A further object is to provide a simple, compact and highly sensitive testing machine capable of making a multiplicity of accurate measurements at a high rate of speed.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a side elevation of my improved testing machine, parts being broken away to show the interior mechanism;

Figure 2 is a detail horizontal section taken substantially on the line 2—2 of Figure 1; and Figure 3 is a vertical section taken substantially on the line 3—3 of Figure 1.

My improved testing machine is preferably mounted directly on the platform of an automatic scale, and the automatic indicating mechanism of such scale is used to indicate the expansive force of the piston rings, etc. placed upon the scale platform in contact with my compressive mechanism. It will be understood that the particular type of automatic scale herein illustrated is selected merely for the purpose of illustration, and that my improved mechanism can be used upon other forms and types of automatic scales. The particular type herein chosen, however, is well adapted for the purpose of illustrating the operation of my testing mechanism, and because that type of scale is well known through extensive commercial use and a considerable number of prior patents, for example, the De Vilbiss Reissue Patent No. 12,137, dated July 28, 1903, it will not be necessary to give a detail description of the scale mechanism.

In the illustrated embodiment, 5 designates a suitable base above which is fulcrumed a scale beam 7 supporting a scale pan or platform 6 and connected within the housing 8 with a pendulum counterbalancing mechanism 9 to which is connected an index arm 10 which swings over the graduated chart 11, upon which chart may be inscribed suitable indications showing, as in pounds and ounces, the expansive force of rings placed upon the scale platform. Suitably secured to the base 5 and preferably arranged within the housing 8 is the cylinder 12 of a dash pot, the plunger of which is connected with the scale beam 7 and adapted to damp the movement of the counterbalancing and indicating mechanism.

Upon the platform 6 of the scale I mount all of the mechanism required for compressing the piston rings being tested to a desired diameter so that the test will be made when all of the rings are of exactly the same size. It will be understood that piston rings when free are normally of greater diameter than when inserted within the grooves in the piston of a motor, and from their positions in such grooves they tend to expand outwardly around their circumference, thus maintaining the closest possible fit between the piston rings and the inner walls of the cylinders. It is to determine the amount of expansive force that would be exerted by these piston rings when in position within the motor that my testing device is designed. Accordingly, I take the free piston rings at their greatest diameter and place them within a grooved holding block 13, the floor of the groove being horizontal so that the piston ring will contact therewith at only one point. A guard 14 for limiting the sidewise movement of the ring is adjustably mounted upon the post 15 threaded upon the scale platform and carrying at its upper end a balanced lever 16 having intermediate its ends a flanged roller 17 arranged to fit over the piston ring so that the flanges on the roller together with the side walls of the groove in the holding block 13 will prevent sidewise play of the piston ring. Immediately above the roller 17 the lever 16 is provided with a contact plate adapted to be engaged by the plunger 18 arranged to move vertically within the bracket 19 in direct alignment with the points of contact of the piston ring with the roller 17 and guide block 13 respectively. The plunger is normally maintained at its uppermost position by the small coil spring 20 and engages the cam surface of the cam 21 fixed on the hand lever 22 (see Figure 3). The lever 22 is mounted upon the bracket 19 and the cam surface 21 is preferably so shaped that there will be a considerable thrust imparted to the plunger 18 for a period of its travel and then the surface is flattened so that continued movement of the lever will move the plunger very slightly, whereby when the piston ring being tested approaches the desired diameter the movement of the plunger will be relatively slow and can be easily controlled. One end of the plunger 16 is preferably provided with a contact point 23 adapted to engage the bell-crank indicator 24 pivoted upon a post 25 carried by the scale platform. The indicator 24 is used in connection with the chart 26 upon which is marked an indicating line with which a similar line on the indicator should exactly register when the piston ring is compressed to the desired diameter. To enable the use of the same testing device with piston rings of different diameters the chart 26 is preferably arranged to be adjusted along the edge of the curved plate 27 and is locked in any desired position thereon by a set screw 28 or the like (see Figure 3). It will be understood that the correct position of the chart 26 with its indicating line is first determined by means of a master ring and then the rings to be tested are compressed until the line on the pointer 24 coincides with the line on the chart 26. A guide 29 may be adjustably mounted upon a post 30 carried by the scale platform so as to permit the easy assembly of the piston rings with their split portions always at the same point. As rings of different diameters are used the guide 29 is slid along the post 30 and locked in the desired position.

The operation of my improved testing device is believed to be apparent form the foregoing description. Thus, a piston ring A is inserted within the grooved holding block 13 with its split portion in alignment with the guide 29 and the rear portion of the ring contacting the guard 14, as shown in Figure 1. The grooved roller 17 in the lever 16 is then forced downwardly through the hand lever 22 and plunger 18, the continued travel of the lever compressing the ring A until it is of the exact diameter desired (as shown by the pointer 24 and chart 26). The force exerted to compress the ring A is transmitted through the ring to the platform of the scale (since the piston ring and associated mechanism are carried by the scale platform), and is counterbalanced by the pendulum mechanism 9. The amount of the force thus counterbalanced is shown on the chart 11 and will, of course, be equivalent to the expansive force of the piston ring if the index hand 10 points to zero on the chart when the piston ring and associated mechanism are in place. To insure the location of this index hand at zero with rings of different diameters and weights I provide the adjustable weight 31 on the scale beam 7 and with it offset the hitherto unbalanced weight of all of the testing mechanism carried by the scale platform and the weight of the ring A. Other forms of weight-offsetting devices could be used if desired. Since all of the piston rings of the same diameter are of substantially the same weight, one setting of the adjustable weight 31 should be sufficient for the testing of all of the piston rings of that diameter, and should it appear when one of the piston rings of that size is placed on the platform that the index hand does not register with zero, it will be apparent to the operator that such piston ring is not of the desired weight.

Thus my testing device will keep a check upon the weight of the piston rings being tested while indicating the expansive force of each ring. Ordinarily, if the expansive force is within a given tolerance it is sufficent for the uses of the motor builder, but it will be evident that if necessary the precise expansive force of each ring can be determined.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a device of the character described, a movable platform having a support thereon for rings to be tested, means for compressing the ring to a desired diameter against the expansive force of said ring, and means including a pendulum counterbalance mechanism directly connected with the platform for indicating the amount of such expansive force.

2. In a device of the character described, a movable platform having a support thereon for rings to be tested, means for compressing the ring to a desired diameter against the expansive force of said ring, and means including a pendulum directly connected with the platform and having an attached pointer for indicating the amount of such expansive force.

3. A device of the character described comprising a chart for indicating the expansive force of rings to be tested, a pointer co-operating with the chart, a pendulum counterbalance co-acting with the pointer, a platform connection therefrom to the pendulum, a support on the platform for the rings to be tested, means adapted to engage the ring when in such support for compressing it to a desired diameter, and means carried externally of said platform for compressing the ring against its expansive force.

4. A device of the character described comprising a chart for indicating the expansive force of rings to be tested, a pointer co-operating with the chart, a pendulum counterbalance co-acting with the pointer, a platform connection therefrom to the pendulum, and means for compressing the ring to be tested against its expansive force, including a support on the platform for the ring to be tested, a lever supported on the platform and arranged to contact the ring, means co-operating with the lever for indicating when the ring has been compressed to a desired diameter, and mechanism for exerting a compressive force upon the ring.

5. A device of the character described comprising a chart for indicating the expansive force of rings to be tested, a pointer co-operating with the chart, a pendulum counterbalance co-acting with the pointer, a platform connection therefrom to the pendulum, and means for compressing the ring to be tested against its expansive force, including a support on the platform for the ring to be tested, a lever supported on the platform and arranged to contact the ring, a pointer co-operating with the lever for indicating when the ring has been compressed to a desired diameter, and mechanism for exerting a compressive force upon the ring.

6. A device of the character described comprising a chart for indicating the expansive force of rings to be tested, a pointer co-operating with the chart, a pendulum counterbalance co-acting with the pointer, a platform connection therefrom to the pendulum, and means for compressing the ring to be tested against its expansive force, including a support on the platform for the ring to be tested, a lever supported on the platform and arranged to contact the ring, means co-operating with the lever for indicating when the ring has been compressed to a desired diameter, and mechanism for exerting a compressive force upon the ring, including a cam-actuated device for rocking the lever.

7. A device of the character described comprising a chart for indicating the expansive force of rings to be tested, a pointer co-operating with the chart, a pendulum counterbalance co-acting with the pointer, a platform connection therefrom to the pendulum, and means for compressing the ring to be tested against its expansive force, including a support on the platform for the ring to be tested, a lever supported on the platform and arranged to contact the ring, means co-operating with the lever for indicating when the ring has been compressed to a desired diameter, and mechanism for exerting a compressive force upon the ring, including a plunger arranged to contact the lever and means for reciprocating the plunger.

8. A device of the character described comprising a chart for indicating the expansive force of rings to be tested, a pointer co-operating with the chart, a pendulum counterbalance co-acting with the pointer, a platform connection therefrom to the pendulum, and means for compressing the ring to be tested against its expansive force, including a support on the platform for the ring to be tested, a lever supported on the platform and arranged to contact the ring, means co-operating with the lever for indicating when the ring has been compressed to a desired diameter, and mechanism for exerting a compressive force upon the ring, including a plunger arranged to contact the lever and a cam contacting with and adapted to reciprocate the plunger.

9. A device of the character described comprising a chart for indicating the expansive force of rings to be tested, a pointer co-operating with the chart, a pendulum counterbalance co-acting with the pointer, a platform connection therefrom to the pendulum, and means for compressing the ring to be tested against its expansive force, including a support on the platform for the ring to be tested, a lever supported on the platform and arranged to contact the ring, means co-operating with the lever for indicating when the ring has been compressed to a desired diameter, and mechanism for exerting a compressive force upon the ring, including a plunger arranged to contact the lever and a hand lever carrying a cam adapted to contact with and reciprocate the plunger.

CLARENCE H. HAPGOOD.

Witnesses:
T. A. CROWLEY,
H. H. LYBRAND.